(12) United States Patent
Scott

(10) Patent No.: US 12,433,426 B2
(45) Date of Patent: Oct. 7, 2025

(54) CHILD CARRYING BACKPACK DEVICE

(71) Applicant: Zachary Wayne Scott, Millbrook, AL (US)

(72) Inventor: Zachary Wayne Scott, Millbrook, AL (US)

(*) Notice: Subject to any disclaimer, the term of this patent is extended or adjusted under 35 U.S.C. 154(b) by 78 days.

(21) Appl. No.: 18/584,662

(22) Filed: Feb. 22, 2024

(65) Prior Publication Data
US 2025/0268395 A1    Aug. 28, 2025

(51) Int. Cl.
*A47D 13/02* (2006.01)
*A47D 11/00* (2006.01)

(52) U.S. Cl.
CPC ............ *A47D 13/027* (2022.08); *A47D 11/00* (2013.01); *A47D 13/025* (2013.01)

(58) Field of Classification Search
CPC ..... A47D 13/027; A47D 13/02; A47D 13/025
USPC .................................................. 224/158–161
See application file for complete search history.

(56) References Cited

U.S. PATENT DOCUMENTS

| | | | |
|---|---|---|---|
| 3,989,173 A | 11/1976 | Gebhard | |
| 4,718,715 A | 1/1988 | Ho | |
| 4,762,256 A * | 8/1988 | Whitaker | B62B 7/08 |
| | | | 280/30 |
| 6,220,621 B1 * | 4/2001 | Newton | B62B 5/0023 |
| | | | 280/650 |
| 7,445,559 B2 * | 11/2008 | Kakuda | A47D 9/016 |
| | | | 5/93.1 |
| 8,894,089 B2 * | 11/2014 | Clifton | B62B 5/0023 |
| | | | 280/647 |
| 9,877,595 B2 | 1/2018 | Wang | |
| 10,342,320 B2 | 7/2019 | Wang | |
| D908,347 S | 1/2021 | Sun | |
| 11,045,014 B2 * | 6/2021 | Wang | A47D 13/027 |
| 2003/0192925 A1 * | 10/2003 | Boone | B60N 2/2842 |
| | | | 224/628 |
| 2009/0320241 A1 * | 12/2009 | Lazert | A47D 13/025 |
| | | | 16/239 |
| 2021/0393011 A1 | 12/2021 | Graham | |

FOREIGN PATENT DOCUMENTS

EP        3925483      12/2021

* cited by examiner

*Primary Examiner* — Adam J Waggenspack

(57) ABSTRACT

A child carrying backpack device for includes a frame that includes a pair of first legs. A panel is attached to the frame such that the panel extends between the pair of first legs. A shoulder harness is attached to the panel for wearing over shoulders of a user in the convention of a backpack. A pair of second legs is each pivotally attached to a respective one of the first legs which can be positioned in a deployed position having each of the second legs angling away from the respective first leg for standing upon a support surface. A child chair is attached to the panel which can have a child seated in the child chair thereby facilitating the user to carry the child on their back when the shoulder harness is worn over the user's shoulders.

10 Claims, 10 Drawing Sheets

CHILD CARRYING BACKPACK DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to child carrying devices and more particularly pertains to a new child carrying device for carrying a child on a user's back as well as facilitating the child to be placed in a stationary seated position. The device includes a frame and a child seat attached to the frame in which a child can be seated. The device includes shoulder straps for wearing over a user's shoulders to carry the child in the convention of a backpack. The frame includes first legs and second legs pivotally attached to the first legs which can be positioned in a deployed position to facilitate the frame to be positioned on a support surface in the convention of a chair.

(2) Description of Related Art Including Information Disclosed Under 37 CFR 1.97 and 1.98

The prior art relates to child carrying devices including a variety of chairs that have a collapsible frame and shoulder straps for carrying a child on a user's back, a plurality of backpacks that has a seating element for accommodating a child. In no instance does the prior art disclose a child chair attached to rigid frame and a shoulder harness attached to the rigid frame for wearing on a user's shoulders.

BRIEF SUMMARY OF THE INVENTION

An embodiment of the disclosure meets the needs presented above by generally comprising a frame that includes a pair of first legs. A panel is attached to the frame such that the panel extends between the pair of first legs. A shoulder harness is attached to the panel for wearing over shoulders of a user in the convention of a backpack. A pair of second legs is each pivotally attached to a respective one of the first legs which can be positioned in a deployed position having each of the second legs angling away from the respective first leg for standing upon a support surface. A child chair is attached to the panel which can have a child seated in the child chair thereby facilitating the user to carry the child on their back when the shoulder harness is worn over the user's shoulders.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
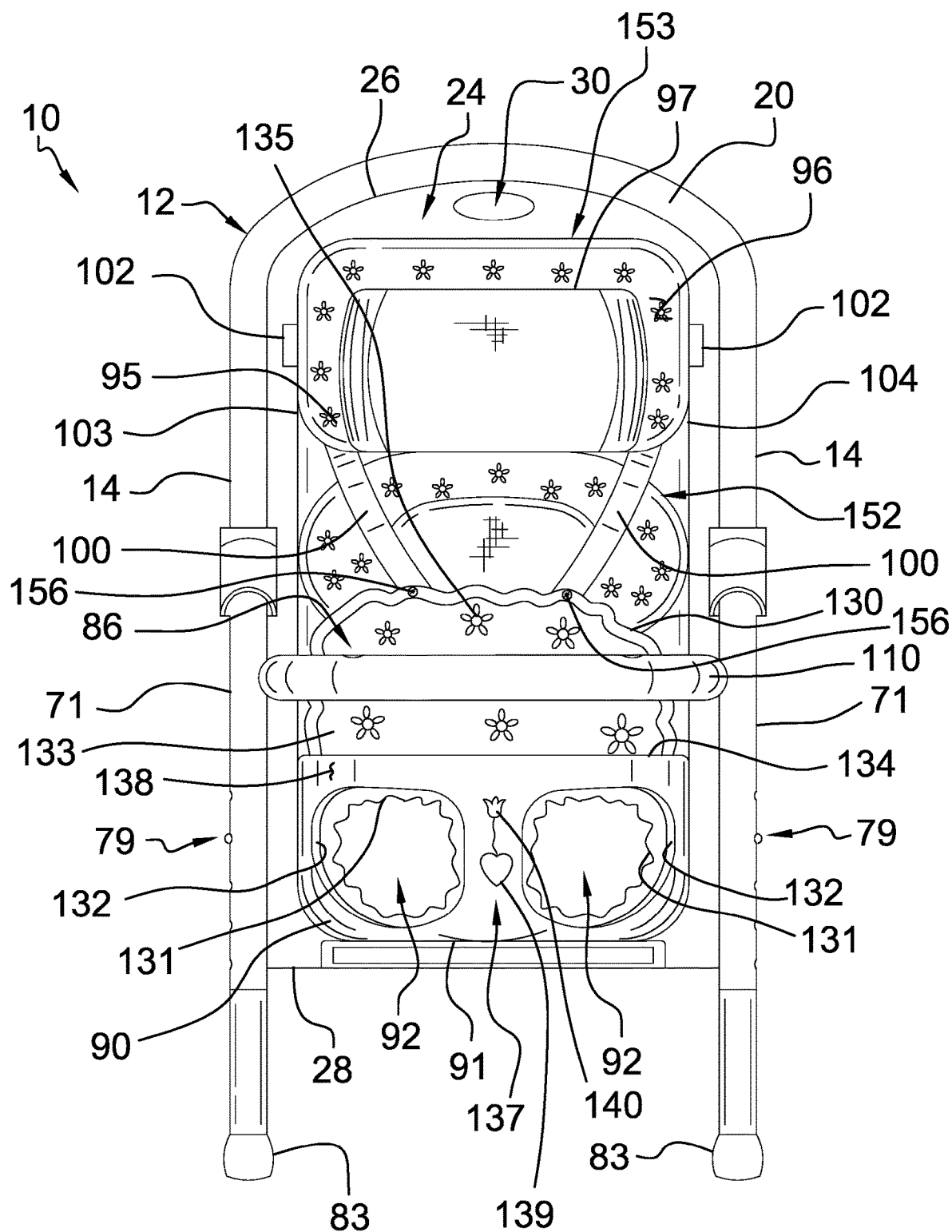
FIG. 1 is a back view of a child carrying backpack device according to an embodiment of the disclosure.
Figure 2:
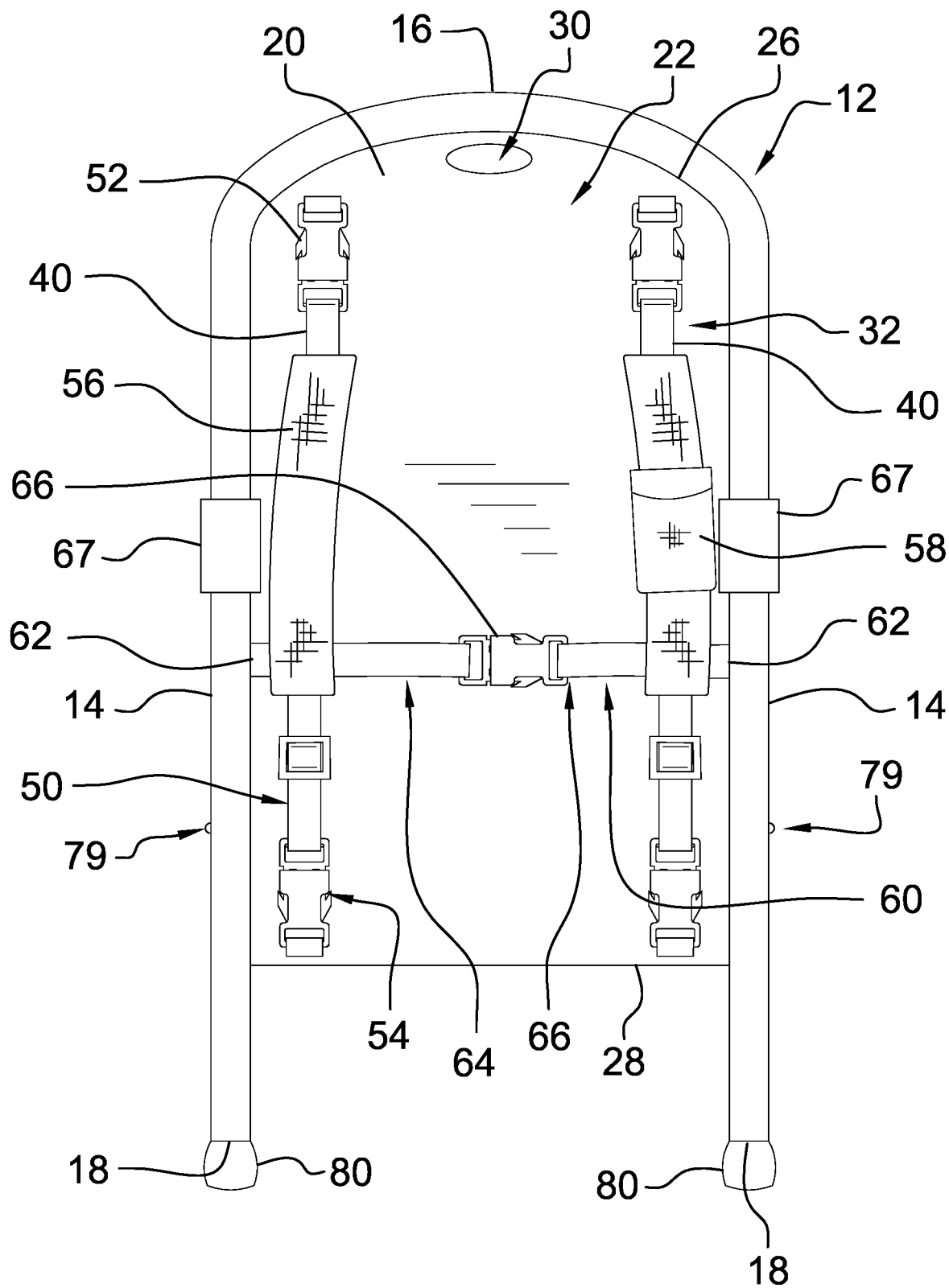
FIG. 2 is a front view of an embodiment of the disclosure.

With reference now to the drawings, and in particular to FIGS. 1 through 10 thereof, a new child carrying device embodying the principles and concepts of an embodiment of the disclosure and generally designated by the reference numeral 10 will be described.

As best illustrated in FIGS. 1 through 10, the child carrying backpack device 10 generally comprises a frame 12 that is curved into a U-shape defining a pair of first legs 14 of the frame 12 and a central portion 16 of the frame 12 extending between the pair of first legs 14 of the frame 12. Each of the first legs 14 has a distal end 18 with respect to the central portion 16 and the central portion 16 curves upwardly between each of the pair of first legs 14. A panel 20 is attached to the frame 12 such that the panel 20 extends between the pair of first legs 14. The panel 20 has a front side 22, a back side 24 and a perimeter edge 26 extending between the front side 22 and the back side 24. The perimeter edge 26 is attached to each of the first legs 14 and the central portion 16 of the frame 12 and the perimeter edge 26 has a bottom side 28 that is spaced upwardly from the distal end 18 of each of the first legs 14. The panel 20 has a hole 30 extending through the front side 22 and the back side 24 thereby facilitating the panel 20 to be gripped for carrying the frame 12 and the panel 20. Additionally, the hole 30 is centrally positioned between the pair of first legs 14 and the hole 30 is spaced from the central portion 16 of the frame 12.

A shoulder harness 32 is attached to the panel 20 such that the shoulder harness 32 can be worn over shoulders 34 of a user 36 having the panel 20 resting against the user's back 38 thereby facilitating the frame 12 to be transported in the convention of a backpack. Conversely, the shoulder harness 32 can be worn on the user's shoulders 34 such that the panel 20 rests against the user's chest 39. The shoulder harness 32 comprises a pair of shoulder straps 40 that each has a first end 42 and a second end 44 which are each attached to the front side 22 of the panel 20. The first end 42 of each of the shoulder straps 40 is positioned proximate the central portion 16 of the frame 12 and the second end 44 of each of the shoulder straps 40 is positioned proximate the bottom side 28 of the perimeter edge 26 of the panel 20. Each of the shoulder straps 40 is positioned adjacent to a respective one of the pair of first legs 14 of the frame 12.

Each of the pair of shoulder straps 40 comprises an upper strap 46, a lower strap 48 and a middle strap 50 that is removably attachable between the upper strap 46 and the lower strap 48. Each of the pair of shoulder straps 40 includes a first buckle 52 that is attached between the upper strap 46 and the middle strap 50 for releasably attaching the upper strap 46 to the middle strap 50. Each of the pair of shoulder straps 40 includes a second buckle 54 which is attached between the lower strap 48 and the middle strap 50 for releasably attaching the lower strap 48 to the middle strap 50. Each of the pair of shoulder straps 40 includes a cushion 56 that is disposed on the middle strap 50. The cushion 56 associated with each of the pair of shoulder straps 40 is comprised of a resiliently compressible material to enhance comfort for the user 36. A smart phone pouch 58 is provided and a respective one of the shoulder straps 40 extends through the smart phone pouch 58 thereby facilitating a personal electronic device 55, such as a smart phone for example, to be secured to the respective shoulder strap 40.

The shoulder harness 32 includes a chest strap 60 which has a pair of ends 62 that is each attached to a respective one of the pair of first legs 14. The chest strap 60 extends across the user's chest 63 when the pair of shoulder straps 40 is worn over the user's shoulders 34. The chest strap 60 comprises a first half 64 and a second half 65 and the chest strap 60 includes a chest buckle 66 that is attached between the first half 64 and the second half 65 for releasably attaching the first half 64 to the second half 65. A pair of pivots 67 is provided and each of the pivots 67 comprises a first tube 69 that is positioned around a respective one of the first legs 14 of the frame 12. Each of the pivots 67 includes a second tube 70 angling away from the first tube 69. Furthermore, each of the pair of pivots 67 is positioned closer to the central portion 16 of the frame 12 than the distal end 18 of the respective first leg 14.

A pair of second legs 71 is provided and each of the second legs 71 is pivotally attached to a respective one of the first legs 14. Each of the pair of second legs 71 is positionable in a stored position having the second legs 71 lying against the respective first leg 14. Each of the pair of second legs 71 is positionable in a deployed position having each of the second legs 71 angling away from the respective first leg 14. In this way the pair of first legs 14 and the pair of second legs 71 can be stood upon a support surface 72. Each of the pair of second legs 71 has an upper end 73 which extends into the second tube 70 of a respective one of the pair of pivots 67. Each of the pair of pivots 67 has a pivot point 74 that is disposed on the second tube 70 which pivotally engages a respective of the second legs 71.

Each of the pair of second legs 71 comprises an upper portion 76 which slidably receives a lower portion 77 such that each of the pair of second legs 71 has a telescopically adjustable length. The upper portion 76 has a plurality of holes 78 which are spaced apart from each other and are distributed along a full length of the upper portion 76. Each of the pair of second legs 71 includes a lock 79 that is movably disposed on the lower portion 77. The lock 79 is biased outwardly from the lower portion 77 thereby facilitating the lock 79 to extend outwardly through a respective one of the plurality of holes 78 in the upper portion 76 for adjusting a length of the second legs 71. Thus, each of the second legs 71 can be extended to a maximum length to facilitate the panel 20 to be reclined approximately 40.0 degrees from vertical to position the panel 20 in a reclined orientation. The lock 79 may comprise a spring loaded ball that can be pushed inwardly to facilitate the spring loaded ball to disengage the respective hole 30 to adjust the lower portion 77.

A pair of first feet 80 is attached to the distal end 18 of a respective one of the first legs 14 and each of the first feet 80 has a first well 81 extending upwardly into a bottom end 82 of the first feet 80. A pair of second feet 83 is provided and each of the second feet 83 is attached to a bottom end 84 of the lower portion 77 of a respective one of the pair of second legs 71. Each of the second feet 83 has a second well 75 extending upwardly into a bottom end 85 of the second feet 83. Additionally, each of the first feet 80 and the second feet 83 may comprised of a resiliently compressible material, such as rubber for example, to inhibit the first feet 80 and the second feet 83 from sliding on the support surface 72 when the first feet 80 and the second feet 83 abut the support surface 72.

A child chair 86 is attached to the panel 20 to have a child 87 seated in the child chair 86 thereby facilitating the user 36 to carry the child 87 on their back 89 when the shoulder harness 32 is worn over the user's shoulders 34. The child chair 86 comprises a seat 90 that is coupled to and curves away from the back side 24 of the panel 20. The seat 90 has a lower wall 91 that is perpendicularly oriented with the back side 24 of the panel 20 to facilitate the child 87 to sit on the lower wall 91. The seat 90 has a pair of leg holes 92 each extending through a distal wall 93 of the seat 90 with respect to the back side 24 of the panel 20 to have a respective one of the child's legs 94 extended through a respective one of the leg holes 92. The seat 90 is oriented on the panel 20 such that the lower wall 91 of the seat 90 is positioned adjacent to the bottom side 28 of the perimeter edge 26 of the panel 20.

A back cushion 95 is attached to the back side 24 of the panel 20 to have the child 87 rest against the back cushion 95 when the child 87 is seated in the seat 90. The back cushion 95 extends between the seat 90 and the hole 30 in the panel 20 and the back cushion 95 has a distal surface 96 with respect to the panel 20. The back cushion 95 is comprised of a resiliently compressible material, including but not being limited to foam rubber, memory foam or silicone, for enhancing comfort for the child 87. A head cushion 97 is recessed into the distal surface 96 of the back cushion 95 to have the child's head 99 positioned against the head cushion 97 when the child 87 is seated in the seat 90. The head cushion 97 is comprised of a resiliently compressible material, including but not being limited to foam rubber, memory foam or silicone, to enhance comfort for the child 87. Furthermore, the back cushion 95 and the head cushion 97 are a unitary structure to inhibit the head cushion 97 from being displaced on the back cushion 95.

A pair of child straps 100 is each coupled to and curves away from the distal surface 96 of the back cushion 95 to extend over the child's torso 101 when the child 87 is seated in the seat 90 to inhibit the child 87 from falling out of the seat 90. Additionally, the pair of child straps 100 is oriented to cross each other. A pair of couplers 102 is each coupled to a respective one of a first lateral surface 103 and a second lateral surface 104 of the back cushion 95. Each of the couplers 102 has a pin 105 extending laterally away from the couplers 102 and each of the couplers 102 is aligned with the head cushion 97. As is most clearly shown in FIG. 3, bracket 106 is provided that is removably attachable to the pair of couplers 102 and a head cover 107 is attached to the bracket 106 such that the head cover 107 extends over the child's head 99 to shade the child 87. As is additionally shown in FIG. 3, an insect net 109 is provided that can be attached to an attachment point 108 disposed on the central portion 16 of the frame 12 to facilitate the insect net 109 to be draped over the child 87 to protect the child 87 from biting insects. Additionally, the attachment point 108 is positioned beneath the head cover 107.

A bar 110 is provided that is curved between each of a primary end 111 and a secondary end 112 of the bar 110 such that the bar 110 has a U-shape. Each of the primary end 111 and the secondary end 112 are removably attachable to the back side 24 of the panel 20 such that the bar 110 curves around the child 87 when the child 87 is seated in the child seat 90. A pair of cameras 114 may be attached to the bar 110 which each faces upwardly toward the child's head 108 when the bar 110 is attached to the back side 24 of the panel 20. Additionally, each of the cameras 114 may have wireless communication capabilities which may employ Bluetooth communication protocols to facilitate imagery captured by the cameras 114 to be viewed on the personal electronic device 55. In this way the user 36 can view the child 87 on their personal electronic device 55 while the user 36 is wearing the shoulder harness 32. Each of the cameras 114 might include a data port to facilitate a wired connection to the personal electronic device 55.

A foot tray 115 is attached to and extends away from the back side 24 of the panel 20. The foot tray 115 is aligned with the bottom side 28 of the perimeter edge 26 of the panel 20 such that the foot tray 115 is positioned beneath the lower wall 91 of the seat 90. The foot tray 115 has a distal end 116 with respect to the back side 24, the foot tray 115 is substantially hollow and the distal end 116 of the foot tray 115 is open. A footrest 117 is slidably positioned in the foot tray 115 and the footrest 117 is slidable outwardly from the distal end 116 of the foot tray 115 to have the child's feet 118 positioned thereon when the child 87 is seated in the seat 90. A plurality of rollers 119 is provided and each of the plurality of rollers 119 has a stem 120 extending upwardly from rollers 119. The stem 120 associated with a respective one of the plurality of rollers 119 is insertable into the first well 81 in a respective one of the first feet 80 and the stem 120 associated with a respective one of the plurality of rollers 119 is insertable into the second well 75 in a respective one of the second feet 83. In this way the rollers 119 facilitate the child 87 to be rocked back and forth to soothe the child 87.

Figure 8:
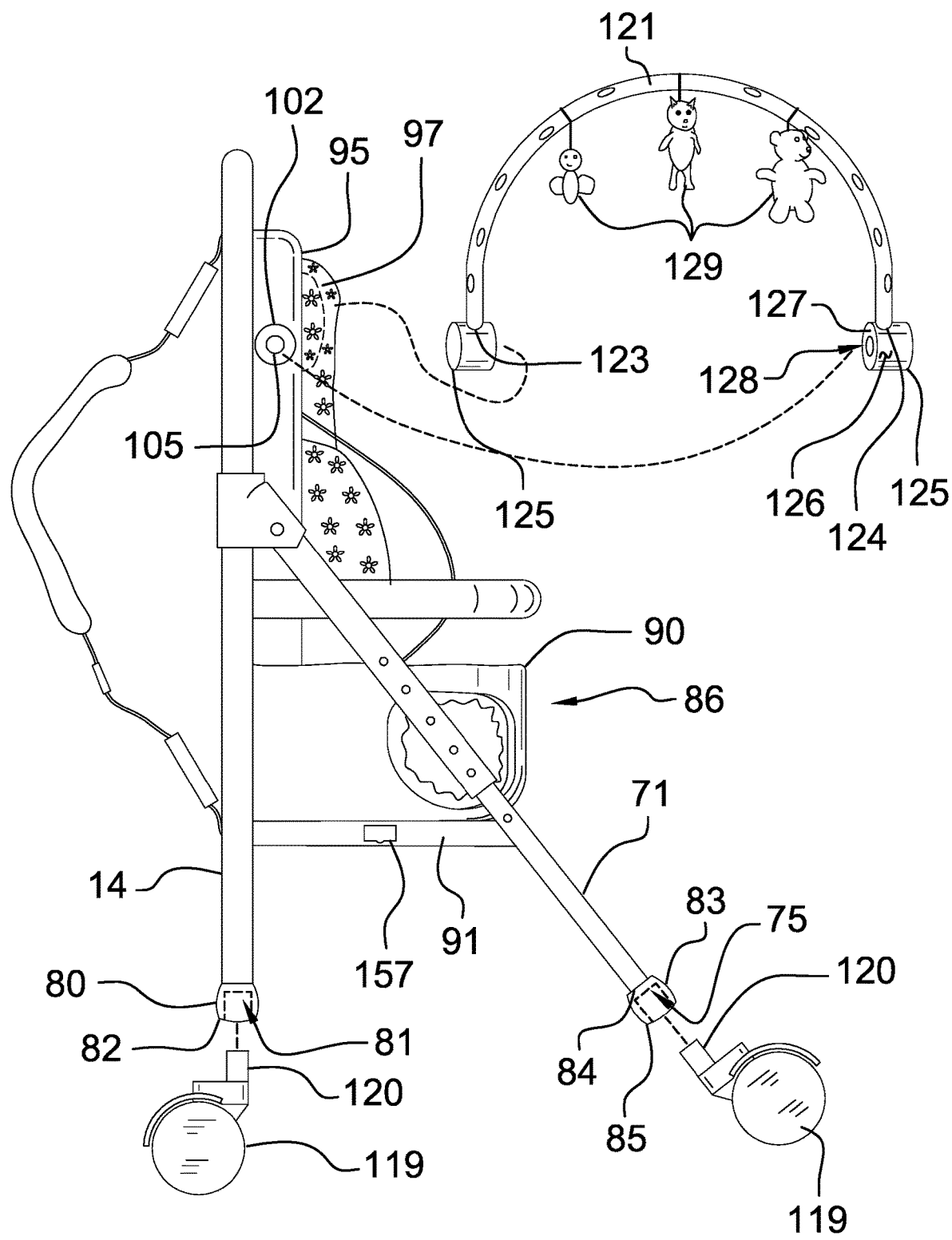
FIG. 8 is a perspective view of an embodiment of the disclosure showing an accessory hanger.

As is most clearly shown in FIG. 8, an accessory hanger 121 is provided that includes a member 122 which is curved between a first end 123 and a second end 124 of the member 122 such that the member 122 is U-shaped. The accessory hanger 121 includes a pair of cylinders 125 that are each attached to a respective one of the first end 123 and second end 124 of the member 122. Each of the cylinders 125 has an outer surface 126 and an attaching face 127; the outer surface 126 of each cylinder 125 is attached to the respective first end 123 and second end 124 of the member 122 having the attaching face 127 of each cylinder 125 being directed away from each other. Additionally, the attaching face 127 of each cylinder 125 has a well 128 that insertably receives the pin 105 associated with a respective one of the couplers 102 that are attached to the back cushion 95. The accessory hanger 121 includes a plurality of toys 129 that are suspended from the member 122 for visually stimulating the child 87.

The child chair 86 includes a curved member 130 that curves upwardly from the distal wall 93 of the seat 90 associated with the child chair 86 such that the curved member 130 extends to approximately chest height on the child 87. In this way the curved member 130 inhibits the child 87 from tipping forwardly from the child chair 86 and potentially falling out of the child chair 86. The curved member 130 lies on a plane that is oriented parallel to back side 24 of the panel 20 and the curved member 130 may be cushioned to enhance comfort for the child 87. A pair of leg cushions 131 is each attached to a bounding edge 132 of a respective one of the leg holes 32 in the distal wall 93 of the seat 90 to enhance comfort for the child's legs 94. A cover 133 is attached between the curved member 130 and an upper edge 134 of the distal wall 93 of the seat 90 and indicia 135 may be applied to the cover 133 which may comprise images of flowers or other ornamental images. Indica 137 are applied to an outwardly facing surface 138 of the distal wall 93 of the seat 90 and the indicia 137 associated with the seat 90 may comprise an image of a heart 139 and a rose 140 growing from the heart 139. Additionally, the indicia 137 associated with the seat may be centrally positioned between the pair of leg holes 92.

Figure 10:
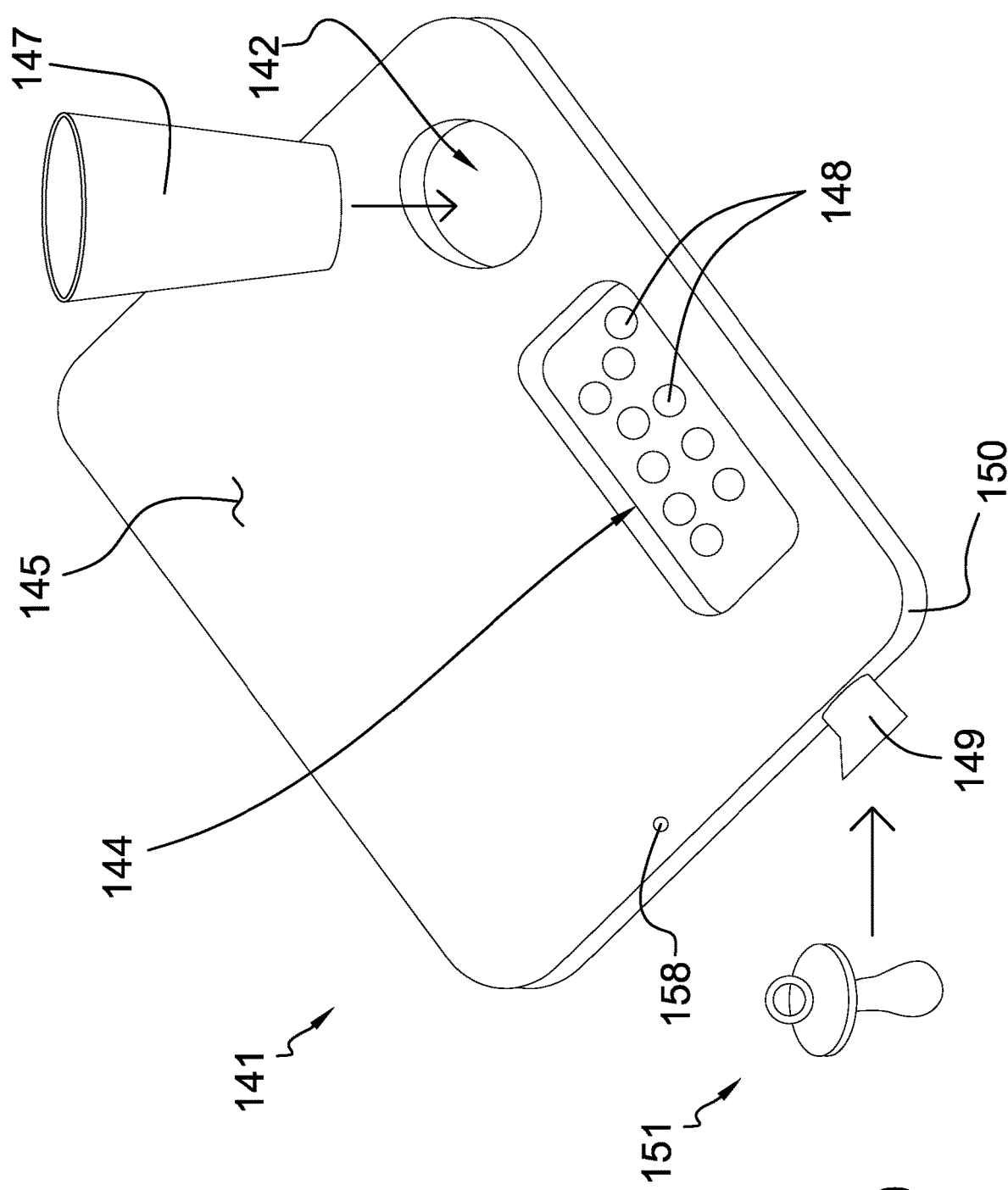
FIG. 10 is a top view of a tray of an embodiment of the disclosure.

As is most clearly shown in FIG. 10, a tray 141 is provided which has a cup recess 142 and a snack recess 144 each extending downwardly into a top surface 145 of the tray 141 for holding a beverage cup 147 and snacks 148. A pacifier holder 149 is attached to an outer edge 150 of the tray 149 for holding a pacifier 151 for the child 87. The tray 141 can be removably attached to the child chair 86 such that the tray 141 is accessible to the child when the child is seated in the child chair 86.

As is most clearly shown in FIG. 1, the back cushion 95 includes a lower portion 155 and an upper portion 156; the lower portion 155 may have a rounded shape and the upper portion may have a rectangular shape. The lower portion 155 has a pair of wings 157 that each extends forward from the lower portion 155 and which are each positioned on respective lateral sides of the lower portion 155 such that each of the pair of wings 157 laterally restrains the child 87 in the lower portion 155. The head cushion 97 is centrally positioned on the upper portion 156 such that the upper portion 156 surrounds the child's head 99 thereby inhibiting the child's head 99 from rolling from side to side. Indicia 158 may be printed on each of the upper portion 156 and the lower portion 155 and the indicia 158 on the upper portion 156 and the lower portion 155 may comprise images of flowers or other ornamental images.

A pair of cameras 159 may be attached to the curved member 130 and each of the pair of cameras 159 on the curved member are oriented to face toward the child 87 when the child 87 is seated in the child chair 86. Additionally, each of the cameras 159 on the curved member 130 may have wireless communication capabilities which may employ Bluetooth communication protocols to facilitate imagery captured by the cameras 159 on the curved member 130 to be viewed on the personal electronic device 55. In this way the user 36 can view the child 87 on their personal electronic device 55 while the user 36 is wearing the shoulder harness 32. Each of the cameras 159 on the curved member 156 might include a data port to facilitate a wired connection to the personal electronic device 55.

Figure 3:
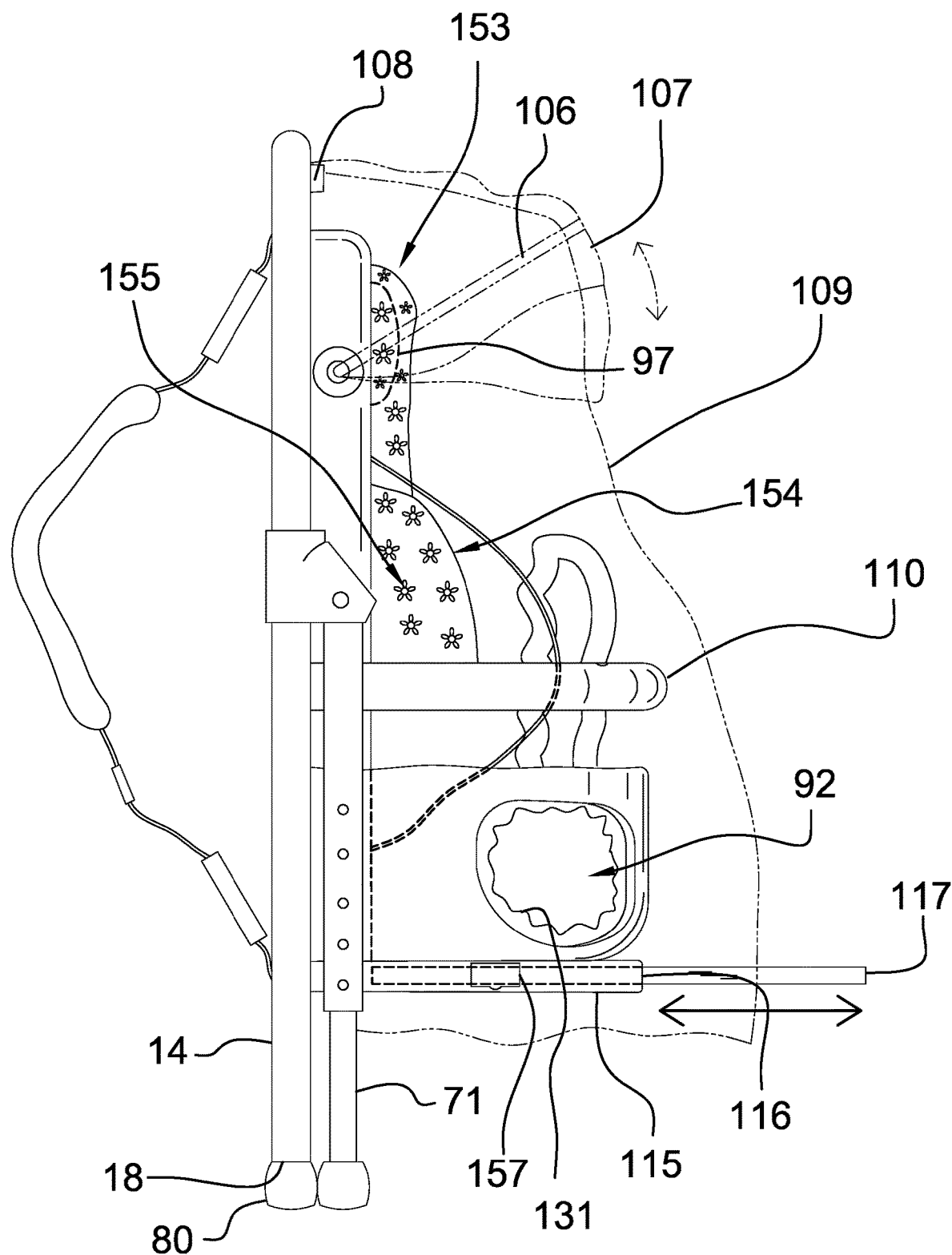
FIG. 3 is a right side view of an embodiment of the disclosure.
Figure 4:
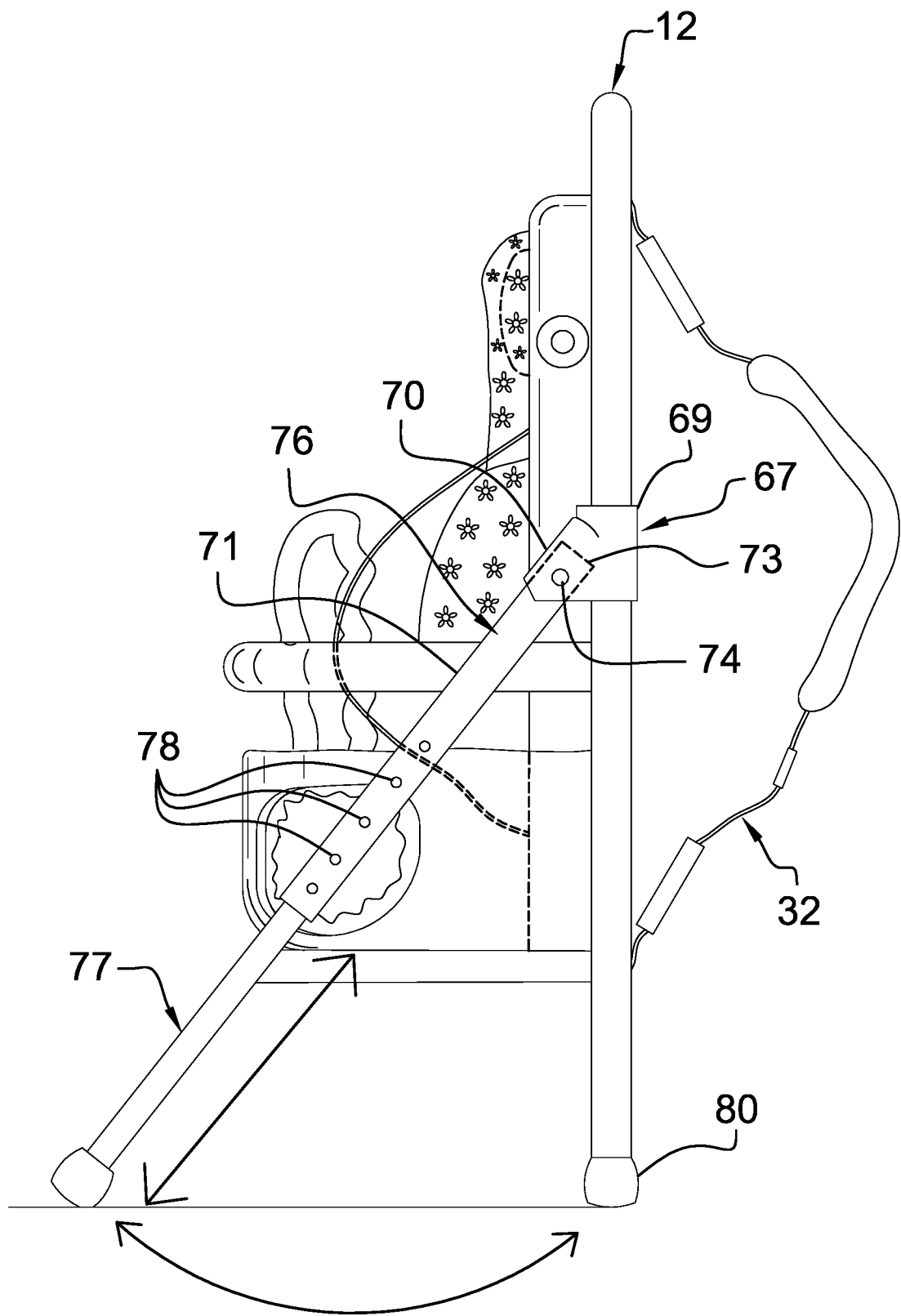
FIG. 4 is a left side view of an embodiment of the disclosure showing second legs in a deployed position.
Figure 5:
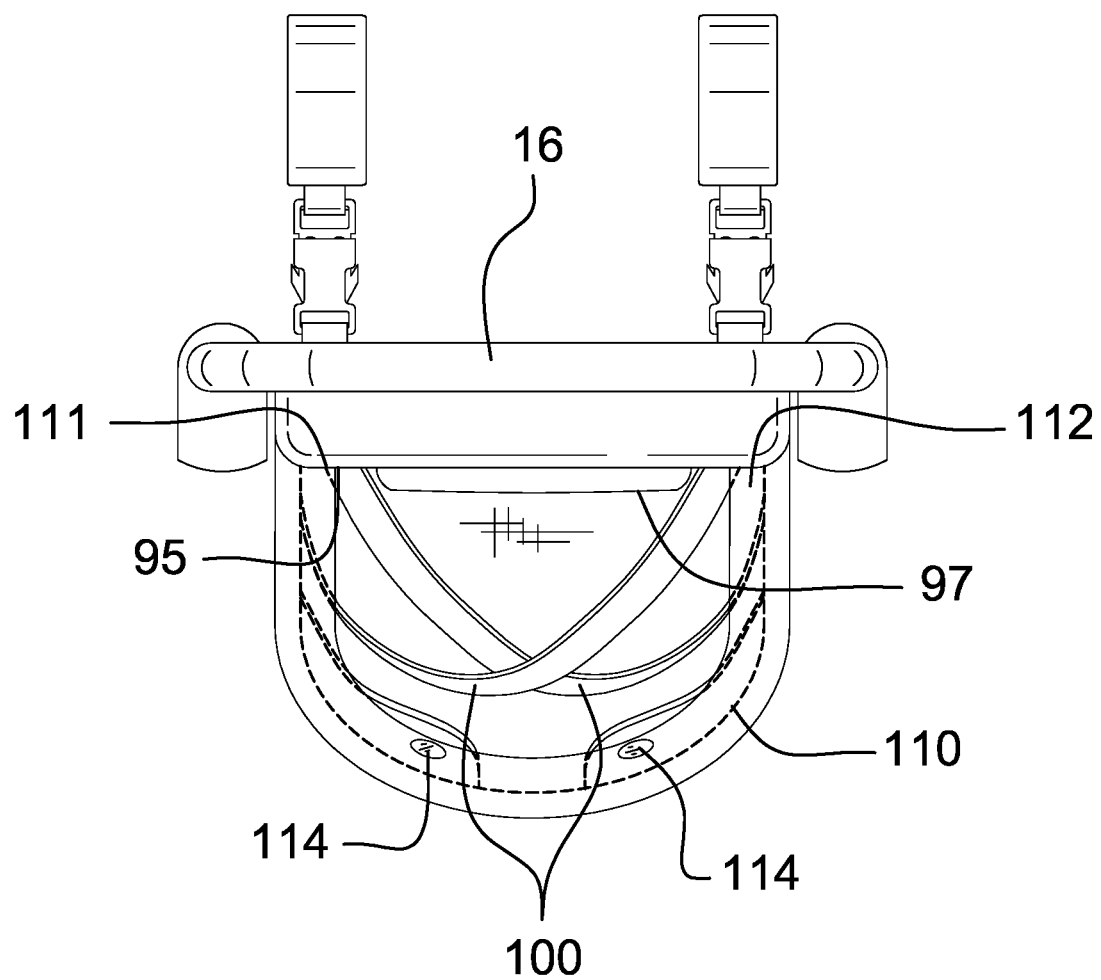
FIG. 5 is a top view of an embodiment of the disclosure.

As is most clearly shown in FIGS. 3 and 8, a data port 160 is integrated into a lateral side of the foot tray 115 and the data port 160 may be in electrical communication with the cameras 114 on the bar 110 and the cameras 159 on the curved member 130 to facilitate imagery captured by the cameras 114 on the bar 110 and the cameras 159 on the curved member 130 to be downloaded into an external electronic device. The data port 160 may comprise a universal serial bus port or other type of common data port. As is most clearly shown in FIG. 10, a camera 161 may be integrated into the top surface 145 of the tray 141. The camera 161 on the top surface 145 of the tray 141 may have wireless communication capabilities which may employ Bluetooth communication protocols to facilitate imagery captured by the camera 161 on the tray 141 be viewed on the personal electronic device 55. In this way the user 36 can view the child 87 on their personal electronic device 55 while the user 36 is wearing the shoulder harness 32. Furthermore, the camera 161 on the tray 141 might include a data port to facilitate a wired connection to the personal electronic device 55.

Figure 6:
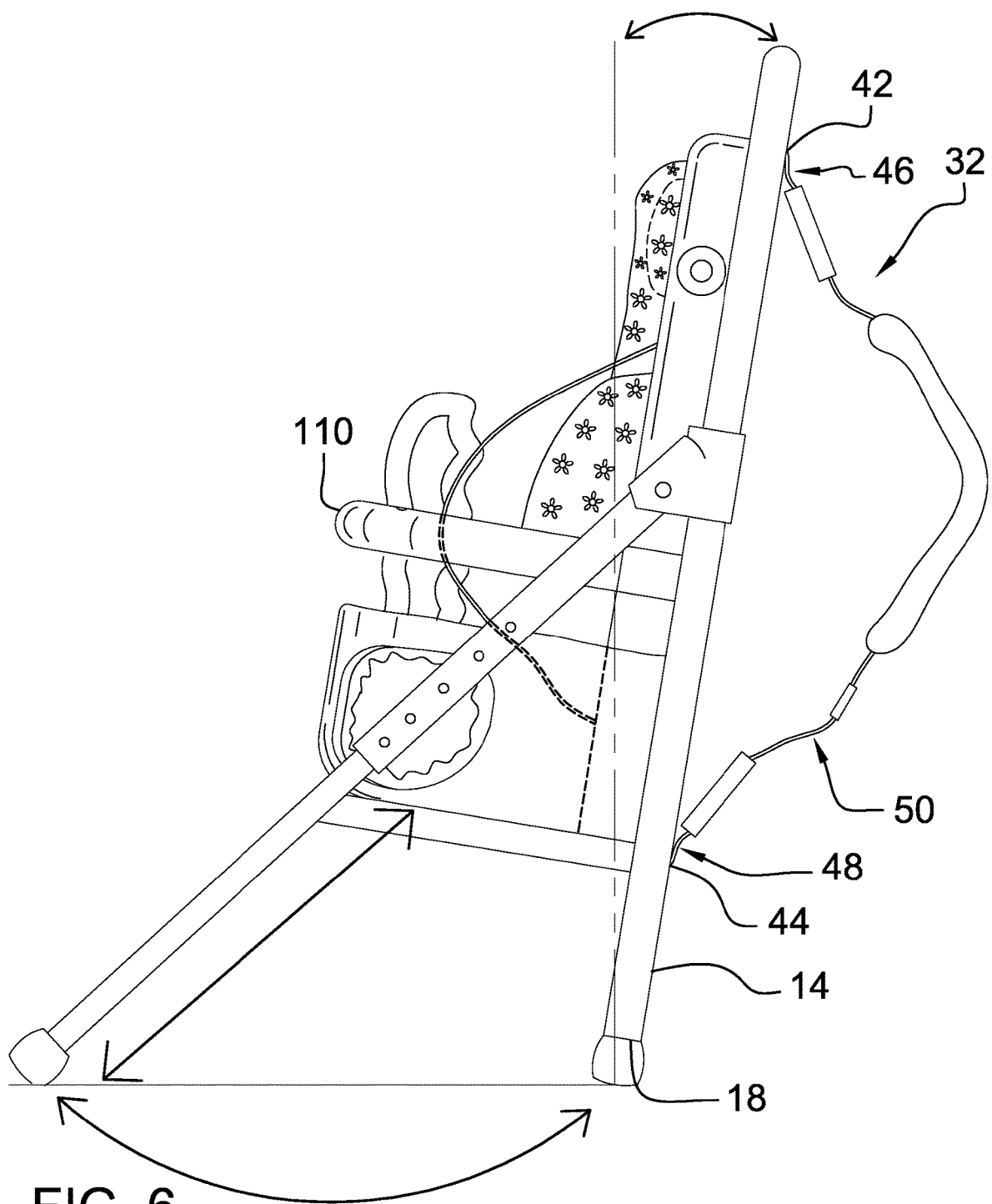
FIG. 6 is a left side view of an embodiment of the disclosure showing second legs in deployed position and being extended for reclining a child chair.
Figure 7:
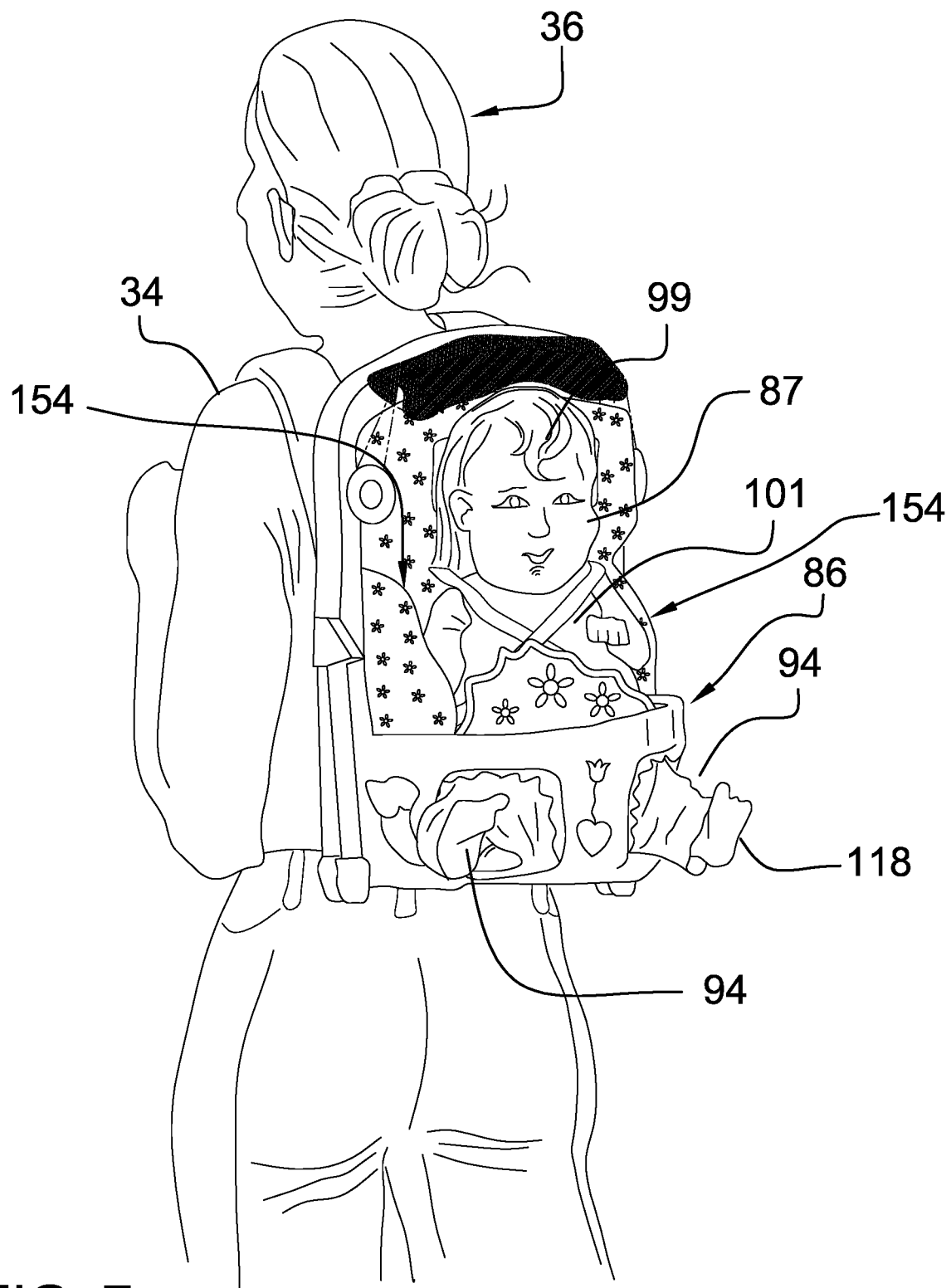
FIG. 7 is a perspective in-use view of an embodiment of the disclosure.
Figure 9:
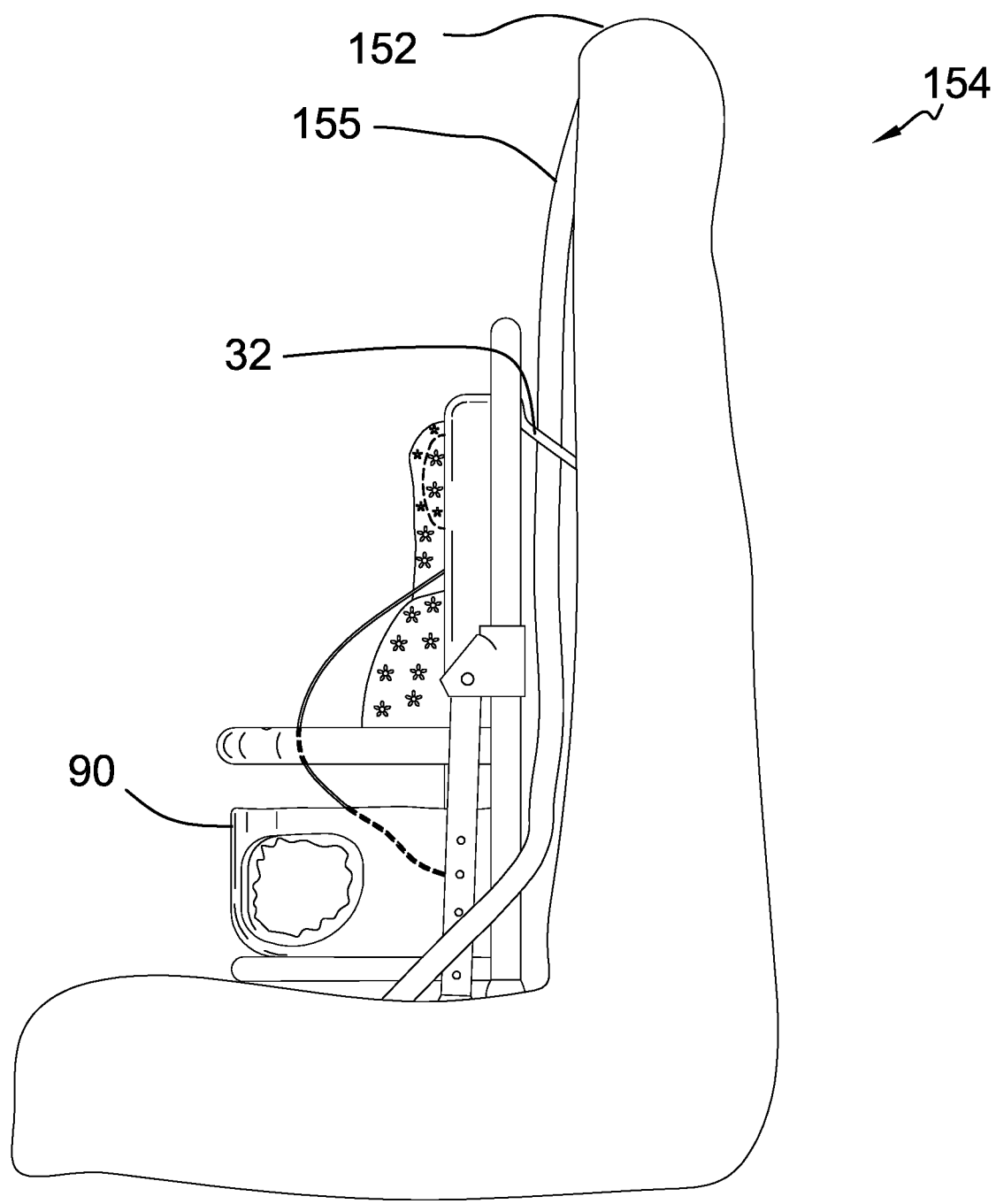
FIG. 9 is perspective in-use view of an embodiment of the disclosure showing a panel and a child chair positioned on a seat of a vehicle.

In use, the second legs 71 are positioned in the stored position and the shoulder harness 32 is worn over the user's shoulders 34 such that the panel 20 rests against the user's back 38. In this way the user 36 can transport the child 87 while the child 87 is seated in the child seat 90 in the convention of wearing a backpack. Furthermore, the child 87 has an unimpeded view of the environment through which the user 36 is walking thereby enhancing enjoyment for the child 87. Additionally, the should harness 32 can be worn such that the panel 20 rests against the user's chest 92. The second legs 71 can be positioned in the deployed position to facilitate the frame 12 and the child seat 90 to be placed on the support surface 72 in the convention of a chair. In this way the child 87 can be seated in a stationary condition without being carried on the user 36. As is shown in FIG. 6, the second legs 71 can be extended to a maximum length to recline the child chair 86 thereby facilitating the child 87 to take a nap. As shown in FIG. 9, the child seat 90 can be placed on a seat 152 of a vehicle 154 and the shoulder harness 32 can be attached to seatbelts 155 of the vehicle 154 thereby facilitating the child seat 90 to function as a car seat for securing the child 87 in the vehicle 154.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A child carrying backpack device being convertible between a backpack for carrying a child and a chair for seating the child, said device comprising:
   a frame being curved into a U-shape defining a pair of first legs of said frame and a central portion of said frame extending between said pair of first legs of said frame;
   a panel being attached to said frame such that said panel extends between said pair of first legs;
   a shoulder harness being attached to said panel wherein said shoulder harness is configured to be worn over shoulders of a user having said panel resting against the user's back thereby facilitating said frame to be transported in the convention of a backpack;
   a pair of second legs, each of said second legs being pivotally attached to a respective one of said first legs, each of said pair of second legs being positionable in a stored position having said second legs lying against said respective first leg, each of said pair of second legs being positionable in a deployed position having each of said second legs angling away from said respective first leg wherein said pair of first legs and said pair of second legs is configured to be stood upon a support surface; and
   a child chair being attached to said panel wherein said child chair is configured to have a child seated in said child chair thereby facilitating the user to carry the child on their back when said shoulder harness is worn over the user's shoulders.

2. The device according to claim 1, wherein:
   each of said first legs having a distal end with respect to said central portion;
   said device includes a pair of first feet, each of said first feet being attached to said distal end of a respective one of said first legs, each of said first feet having a first well extending upwardly into a bottom end of said first feet;
   each of said pair of second legs comprises an upper portion which slidably receives a lower portion such that each of said pair of second legs has a telescopically adjustable length;
   said device includes a pair of second feet, each of said second feet being attached to a bottom end of said lower portion of a respective one of said pair of second legs, each of said second feet having a second well extending upwardly into a bottom end of said second feet; and
   said device includes a plurality of rollers, each of said plurality of rollers having a stem extending upwardly from rollers, said stem associated with a respective one of said plurality of rollers being insertable into said first well in a respective one of said first feet, said stem associated with a respective one of said plurality of rollers being insertable into said second well in a respective one of said second feet.

3. The device according to claim 1, wherein:
said device includes a pair of pivots, each of said pivots comprising a first tube being positioned around a respective one of said first legs of said frame, each of said pivots including a second tube angling away from said first tube, each of said pair of pivots being positioned closer to said central portion of said frame than said distal end of said respective first leg; and
each of said pair of second legs has an upper end extending into said second tube of a respective one of said pair of pivots, each of said pair of pivots having a pivot point being disposed on said second tube which pivotally engages a respective of said second legs.

4. The device according to claim 1, wherein:
said panel has a front side, a back side and a perimeter edge extending between said front side and said back side, said perimeter edge being attached to each of said first legs and said central portion of said frame, said perimeter edge having a bottom side being spaced upwardly from a distal end of each of said first legs; and
said panel has a hole extending through said front side and said back side thereby facilitating said panel to be gripped for carrying said frame and said panel, said hole being centrally positioned between said pair of first legs, said hole being spaced from said central portion of said frame.

5. The device according to claim 1, wherein:
said panel has a front side and a perimeter edge, said perimeter edge having a bottom side; and
said shoulder harness comprises:
    a pair of shoulder straps, each of said shoulder straps having a first end and a second end each being attached to said front side of said panel, said first end of each of said shoulder straps being positioned proximate said central portion of said frame, said second end of each of said shoulder straps being positioned proximate said bottom side of said perimeter edge of said panel, each of said shoulder straps being positioned adjacent to a respective one of said pair of first legs of said frame; and
    a chest strap having a pair of ends each being attached to a respective one of said pair of first legs wherein said chest strap is configured to extend across the user's chest when said pair of shoulder straps is worn over the user's shoulders, said chest strap comprising a first half and a second half, said chest strap including a second buckle being attached between said first half and said second half for releasably attaching said first half to said second half.

6. The device according to claim 5, wherein each of said pair of shoulder straps includes:
an upper strap and a lower strap and a middle strap being removably attachable between said upper strap and said lower strap;
a first buckle being attached between said upper strap and said middle strap for releasably attaching said upper strap to said middle strap;
a second buckle being attached between said lower strap and said middle strap for releasably attaching said lower strap to said middle strap; and
a cushion being disposed on said middle strap, said cushion associated with each of said pair of shoulder straps being comprised of a resiliently compressible material wherein said cushion associated with each of said pair of shoulder straps is configured to enhance comfort for the user.

7. The device according to claim 1, wherein:
said panel has a back side and a perimeter edge, said perimeter edge having a bottom side;
said child chair comprises:
    a seat being coupled to and curving away from said back side of said panel, said seat having a lower wall being perpendicularly oriented with said back side of said panel wherein said lower wall is configured to have the child sit on said lower wall, said seat having a pair of leg holes each extending through a distal wall of said seat with respect to said back side of said panel wherein each of said leg holes is configured to have a respective one of the child's legs being extended through a respective one of said leg holes, said seat being oriented on said panel such that said lower wall of said seat is positioned adjacent to said bottom side of said perimeter edge of said panel;
    a back cushion being attached to said back side of said panel wherein said back cushion is configured to have the child rest against said back cushion when the child is seated in said seat, said back cushion extending between said seat and said hole in said panel, said back cushion having a distal surface with respect to said panel; and
    a head cushion being recessed into said distal surface of said back cushion wherein said head cushion is configured to have the child's head being positioned against said head cushion when the child is seated in said seat.

8. The device according to claim 7, wherein said child chair includes:
a pair of child straps, each of said child straps being coupled to and curving away from said distal surface of said back cushion wherein each of said child straps is configured to extend over the child's torso when the child is seated in said seat to inhibit the child from falling out of said seat, said pair of child straps being oriented to cross each other; and
a pair of couplers, each of said couplers being coupled to a respective one of a first lateral surface and a second lateral surface of said back cushion, each of said couplers having a pin extending laterally away from said couplers, each of said couplers being aligned with said head cushion.

9. The device according to claim 1, wherein:
said panel has a back side and a perimeter edge, said perimeter edge having a bottom side;
said child chair includes a seat having a lower wall;
said device includes a foot tray being attached to and extending away from said back side of said panel, said foot tray being aligned with said bottom side of said perimeter edge of said panel such that said foot tray is positioned beneath said lower wall of said seat, said foot tray having a distal end with respect to said back side, said foot tray being substantially hollow, said distal end of said foot tray being open; and
said device includes a footrest being slidably positioned in said foot tray, said footrest being slidable outwardly from said distal end of said foot tray wherein said footrest is configured to have the child's feet being positioned thereon when the child is seated in said seat.

10. A child carrying backpack device being convertible between a backpack for carrying a child and a chair for seating the child, said device comprising:

a frame being curved into a U-shape defining a pair of first legs of said frame and a central portion of said frame extending between said pair of first legs of said frame, each of said first legs having a distal end with respect to said central portion, said central portion curving upwardly between each of said pair of first legs;

a pair of first feet, each of said first feet being attached to said distal end of a respective one of said first legs, each of said first feet having a first well extending upwardly into a bottom end of said first feet;

a panel being attached to said frame such that said panel extends between said pair of first legs, said panel having a front side, a back side and a perimeter edge extending between said front side and said back side, said perimeter edge being attached to each of said first legs and said central portion of said frame, said perimeter edge having a bottom side being spaced upwardly from said distal end of each of said first legs, said panel having a hole extending through said front side and said back side thereby facilitating said panel to be gripped for carrying said frame and said panel, said hole being centrally positioned between said pair of first legs, said hole being spaced from said central portion of said frame;

a shoulder harness being attached to said panel wherein said shoulder harness is configured to be worn over shoulders of a user having said panel resting against the user's back thereby facilitating said frame to be transported in the convention of a backpack, said shoulder harness comprising:

a pair of shoulder straps, each of said shoulder straps having a first end and a second end each being attached to said front side of said panel, said first end of each of said shoulder straps being positioned proximate said central portion of said frame, said second end of each of said shoulder straps being positioned proximate said bottom side of said perimeter edge of said panel, each of said shoulder straps being positioned adjacent to a respective one of said pair of first legs of said frame, each of said pair of shoulder straps comprising an upper strap and a lower strap and a middle strap being removably attachable between said upper strap and said lower strap, each of said pair of shoulder straps including a first buckle being attached between said upper strap and said middle strap for releasably attaching said upper strap to said middle strap, each of said pair of shoulder straps including a second buckle being attached between said lower strap and said middle strap for releasably attaching said lower strap to said middle strap, each of said pair of shoulder straps including a cushion being disposed on said middle strap, said cushion associated with each of said pair of shoulder straps being comprised of a resiliently compressible material wherein said cushion associated with each of said pair of shoulder straps is configured to enhance comfort for the user; and a chest strap having a pair of ends each being attached to a respective one of said pair of first legs wherein said chest strap is configured to extend across the user's chest when said pair of shoulder straps is worn over the user's shoulders, said chest strap comprising a first half and a second half, said chest strap including a second buckle being attached between said first half and said second half for releasably attaching said first half to said second half;

a pair of pivots, each of said pivots comprising a first tube being positioned around a respective one of said first legs of said frame, each of said pivots including a second tube angling away from said first tube, each of said pair of pivots being positioned closer to said central portion of said frame than said distal end of said respective first leg;

a pair of second legs, each of said second legs being pivotally attached to a respective one of said first legs, each of said pair of second legs being positionable in a stored position having said second legs lying against said respective first leg, each of said pair of second legs being positionable in a deployed position having each of said second legs angling away from said respective first leg wherein said pair of first legs and said pair of second legs is configured to be stood upon a support surface, each of said pair of second legs having an upper end extending into said second tube of a respective one of said pair of pivots, each of said pair of pivots having a pivot point being disposed on said second tube which pivotally engages a respective of said second legs, each of said pair of second legs comprising an upper portion which slidably receives a lower portion such that each of said pair of second legs has a telescopically adjustable length, said upper portion having a plurality of holes being spaced apart from each other and being distributed along a full length of said upper portion, each of said pair of second legs including a lock being movably disposed on said lower portion, said lock being biased outwardly from said lower portion thereby facilitating said lock to extend outwardly through a respective one of said plurality of holes in said upper portion for adjusting a length of said second legs;

a pair of second feet, each of said second feet being attached to a bottom end of said lower portion of a respective one of said pair of second legs, each of said second feet having a second well extending upwardly into a bottom end of said second feet;

a child chair being attached to said panel wherein said child chair is configured to have a child seated in said child chair thereby facilitating the user to carry the child on their back when said shoulder harness is worn over the user's shoulders, said child chair comprising:

a seat being coupled to and curving away from said back side of said panel, said seat having a lower wall being perpendicularly oriented with said back side of said panel wherein said lower wall is configured to have the child sit on said lower wall, said seat having a pair of leg holes each extending through a distal wall of said seat with respect to said back side of said panel wherein each of said leg holes is configured to have a respective one of the child's legs being extended through a respective one of said leg holes, said seat being oriented on said panel such that said lower wall of said seat is positioned adjacent to said bottom side of said perimeter edge of said panel;

a back cushion being attached to said back side of said panel wherein said back cushion is configured to have the child rest against said back cushion when the child is seated in said seat, said back cushion extending between said seat and said hole in said panel, said back cushion having a distal surface with respect to said panel;

a head cushion being recessed into said distal surface of said back cushion wherein said head cushion is configured to have the child's head being positioned against said head cushion when the child is seated in said seat;

a pair of child straps, each of said child straps being coupled to and curving away from said distal surface of said back cushion wherein each of said child straps is configured to extend over the child's torso when the child is seated in said seat to inhibit the child from falling out of said seat, said pair of child straps being oriented to cross each other; and a pair of couplers, each of said couplers being coupled to a respective one of a first lateral surface and a second lateral surface of said back cushion, each of said couplers having a pin extending laterally away from said couplers, each of said couplers being aligned with said head cushion;

a foot tray being attached to and extending away from said back side of said panel, said foot tray being aligned with said bottom side of said perimeter edge of said panel such that said foot tray is positioned beneath said lower wall of said seat, said foot tray having a distal end with respect to said back side, said foot tray being substantially hollow, said distal end of said foot tray being open;

a footrest being slidably positioned in said foot tray, said footrest being slidable outwardly from said distal end of said foot tray wherein said footrest is configured to have the child's feet being positioned thereon when the child is seated in said seat; and a plurality of rollers, each of said plurality of rollers having a stem extending upwardly from rollers, said stem associated with a respective one of said plurality of rollers being insertable into said first well in a respective one of said first feet, said stem associated with a respective one of said plurality of rollers being insertable into said second well in a respective one of said second feet.

\* \* \* \* \*